(12) United States Patent
Kobayashi et al.

(10) Patent No.: US 6,251,151 B1
(45) Date of Patent: Jun. 26, 2001

(54) AIR CLEANER HAVING A CURVED GUIDE SURFACE FOR AIRFLOW TO AN AIR CLEANING ELEMENT

(75) Inventors: Koki Kobayashi; Masayuki Dazai; Kenichi Nishimoto; Kenichi Nishizawa, all of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/393,154

(22) Filed: Sep. 10, 1999

(30) Foreign Application Priority Data

Sep. 10, 1998 (JP) .................................................. 10-256740

(51) Int. Cl.⁷ .................................................. B01D 35/30
(52) U.S. Cl. .............................. 55/309; 55/385.3; 55/418; 55/DIG. 28; 123/198 E
(58) Field of Search .................................. 55/385.3, 309, 55/320, 332, 418, 434, 482, 491, DIG. 28; 123/198 E; 180/219

(56) References Cited

U.S. PATENT DOCUMENTS 2,365,328 * 12/1944 Bell ........................................ 55/418
5,582,146 * 12/1996 Linsbauer et al. ............... 123/198 E
5,609,658 * 3/1997 Takemura et al. .................. 55/585.3

FOREIGN PATENT DOCUMENTS 996261   4/1997 (JP) .

\* cited by examiner

*Primary Examiner*—David A. Simmons
*Assistant Examiner*—Robert A. Hopkins
(74) *Attorney, Agent, or Firm*—Birch, Stewart, Kolasch & Birch, LLP (57) ABSTRACT

An air cleaner for use in combination with a fuel system of an engine, includes an air cleaning element housed within a casing. Air introduced from an air inlet, defined in the casing, follows an air flow path from the air inlet passing through the air cleaning element. The air flow path includes a direction change of approximately ninety degrees. This direction change transpires over a curved guide surface formed in the casing to reduce the likelihood of vortexes which reduce the air ram pressure. The curved guide surface may include a detachable panel. Also, the panel may include an air path to an air branch chamber. When two air inlets are used, it is advantageous to include a partitioning wall separating the two air flow paths prior to the air cleaning element.

20 Claims, 9 Drawing Sheets

FIG. 10
BACKGROUND ART

AIR CLEANER HAVING A CURVED GUIDE SURFACE FOR AIRFLOW TO AN AIR CLEANING ELEMENT

BACKGROUND OF THE INVENTION

1. Field of the Invention

The present invention relates to air cleaners used in conjunction with engines. More particularly, the present invention concerns air cleaners which utilize ram air pressure.

2. Description of the Related Art

Figure 8:
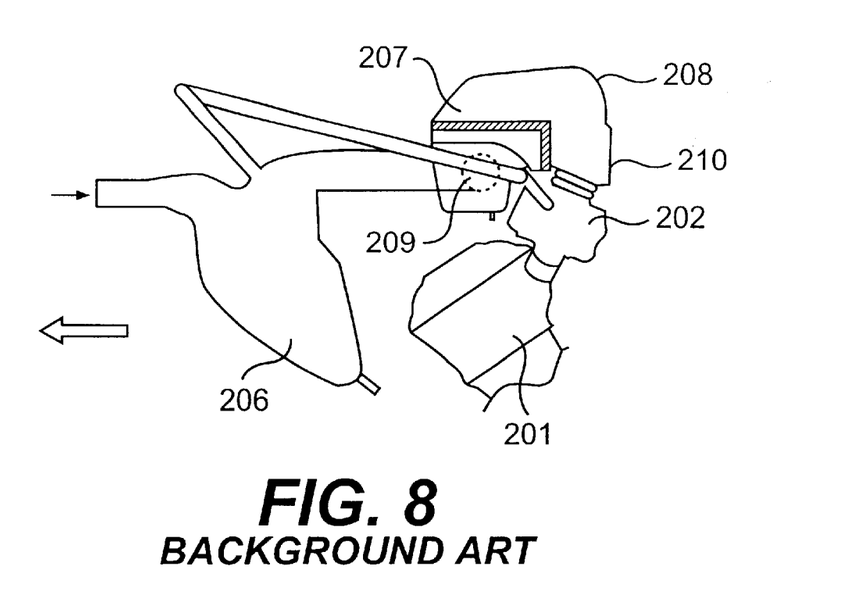
FIG. 8 is a side view of an air intake system according to the background art.
Figure 9:
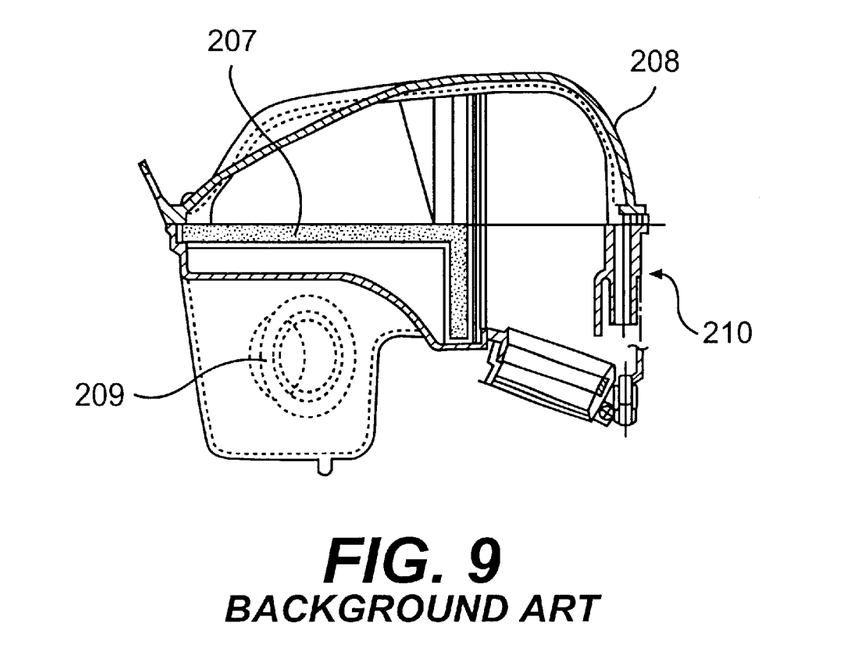
FIG. 9 is a cross-sectional view of an air cleaner of the air intake system of FIG. 8.
Figure 10:
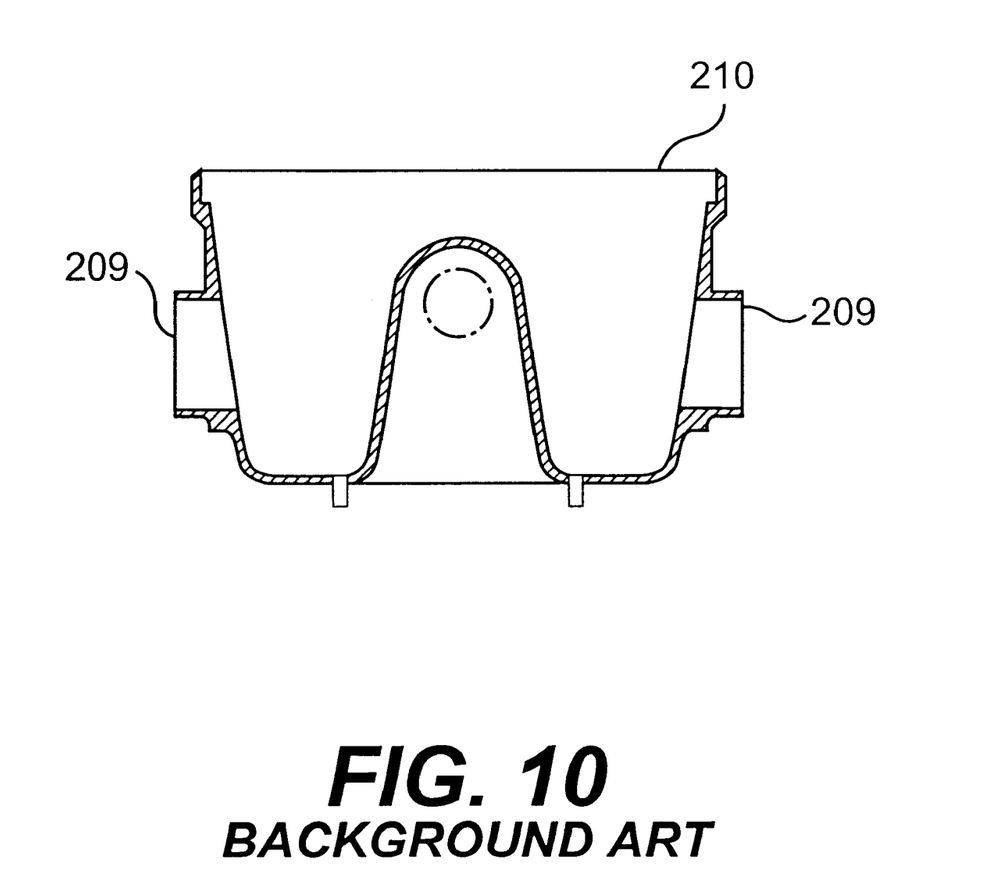
FIG. 10 is a cross-sectional view of a lower portion of the air cleaner of FIG. 9.

Japanese Patent Laid-open No. 9-96261 entitled "Air cleaner for vehicles" discloses an air cleaner of the type which utilizes ram air pressure. Such types of air cleaners are well known. With reference to FIGS. 8–10, ram air is introduced into an intake passage 206 and the air having passed through the intake passage 206 enters into a lower case 210 through an inlet 209. The air then passes from the lower case 210 through an element 207. The clean air that has passed through the element 207 is guided into an upper case 208, and introduced into a carburetor 202 connected to a lower portion of the upper case 208. The ram air is utilized to produce a ram pressure higher than the atmospheric pressure. The ram pressure is applied to the carburetor 202 to supply a high-density air-fuel mixture into an engine 201 for thereby increasing the air-fuel mixture charging efficiency of the engine 201 to increase the output power thereof when the vehicle runs at a high speed.

As shown in FIG. 10, the lower case 210 has left and right inlets 209 with respective intake passages 206 connected thereto. The structure of the lower case 210 and the intake passages 206, as shown in FIG. 8, is of a general nature. With the above structure, air flows introduced from the inlets 209 collide with each other in the center of the lower case 210. Though the ram pressure, higher than the atmospheric pressure, is generated utilizing the ram air, a sufficient ram pressure may not be applied to the carburetor 202. Furthermore, the air flows introduced from the inlets 209 develop vortex flows at the bottom or sides of the lower case 210 (As will be discussed in relation to FIG. 7a, hereinafter). When a vortex flow loss is caused, the ram air cannot effectively be introduced into the carburetor 202 because the resistance in the flow passages is increased.

SUMMARY OF THE INVENTION

It is therefore an object of the present invention to provide an air cleaner which is arranged to improve air flows such that sufficient ram pressure is applied to a carburetor.

According to the present invention, there is provided an air cleaner of the type wherein an air cleaner element is housed in an air cleaner case. Air, introduced from an air inlet defined in the air cleaner case, is passed through an air cleaner element after the direction of flow of the air is changed 90 degrees or substantially 90 degrees. The air cleaner is characterized in that the air cleaner case has a curved guide surface for smoothly guiding the air introduced from the air inlet toward the air cleaner element. The curved guide surface smoothly guides the air introduced from the air inlet toward the air cleaner element, and thereby reduces vortex flows generated by the air introduced from the air inlet.

The air cleaner may also have the curved guide surface formed as a detachable piece. A reverse side of the detached piece and the air cleaner case may define an air branch chamber. A filter is disposed in the air branch chamber and held by a filter presser extending from the detachable piece. The air branch chamber allows part of the air introduced from the air inlet can be led out of the air cleaner case via the detachable piece, through the filter. Preferably, a filter presser extending from the detachable piece holds the filter, so that the number of parts used can be reduced.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

An embodiment of the present invention will now be described with reference to the accompanying drawings. The terms "front", "rear", "left", "right", "upper", "lower," and similar directional terms used herein, refer to directions as viewed from the rider of a motorcycle. Fr, Rr, L, R represent front, rear, left, and right sides, respectively. The FIGS. shall be viewed in accordance with the orientation of the reference characters.

Figure 1:
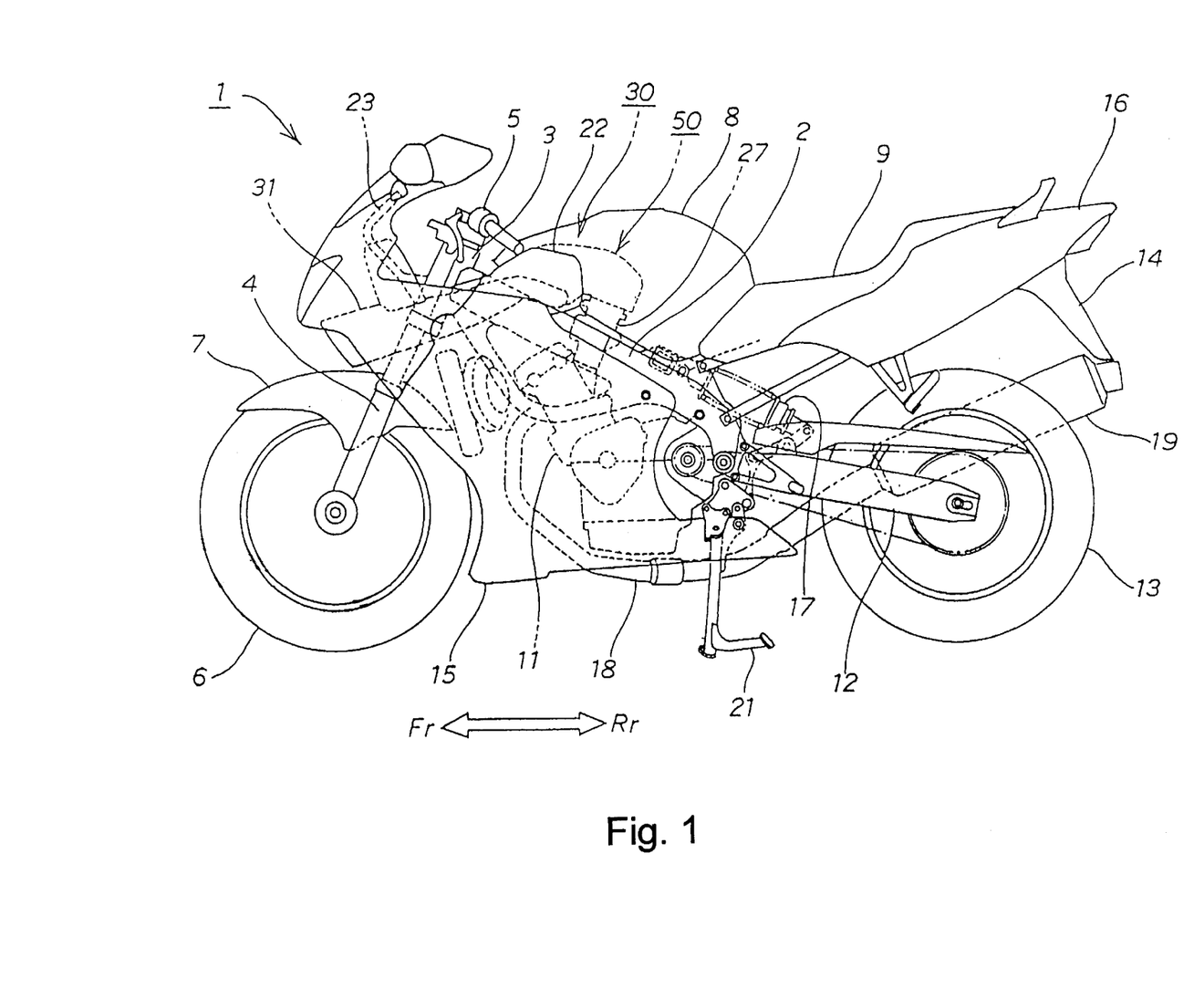
FIG. 1 is a side view of a motorcycle incorporating an air cleaner according to the present invention.

FIG. 1 is a side view of a motorcycle having an air cleaner according to the present invention. The motorcycle 1 comprises a vehicle body frame 2. A head pipe 3 is mounted on a front portion of the vehicle body frame 2. A front fork 4 is rotatably mounted on the head pipe 3. A handle 5 is mounted on an upper portion of the front fork 4.

A front wheel 6 is rotatably mounted on a lower portion of the front fork 4. A front fender 7 covers the front wheel 6. A fuel tank 8 is mounted on the vehicle body frame 2, rearwardly of the bead pipe 3. A seat 9 is disposed rearwardly of the fuel tank 8. A power unit 11 is disposed downwardly of the fuel tank 8 and the seat 9. The power unit 11 comprises an engine and a transmission.

A swing arm 12 is swingably mounted on the vehicle body frame 2, rearwardly of the power unit 11. A rear wheel 13 is rotatably mounted on a rear end of the swing arm 12 and drivable by the power unit 11. A rear fender 14 is disposed upwardly of the rear wheel 13. The motorcycle 1 also includes a front cowl 15, a seat cowl 16, a rear suspension 17, an exhaust pipe 18, a muffler 19, a main stand 21, a duct cover 22, a cowl stay 23, and a carburetor 27.

Figure 2:
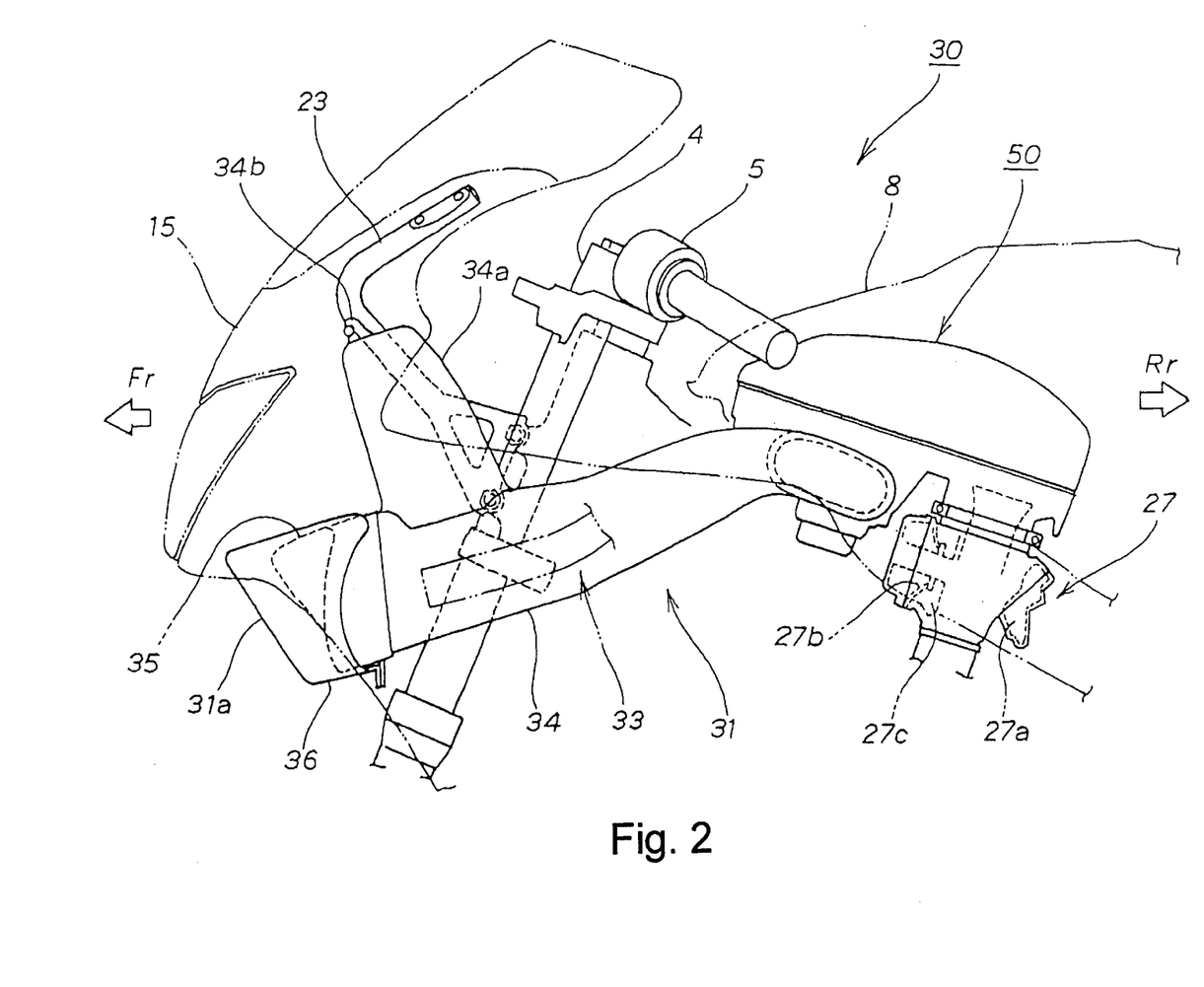
FIG. 2 is a side view of an air intake system according to the present invention.
Figure 3:
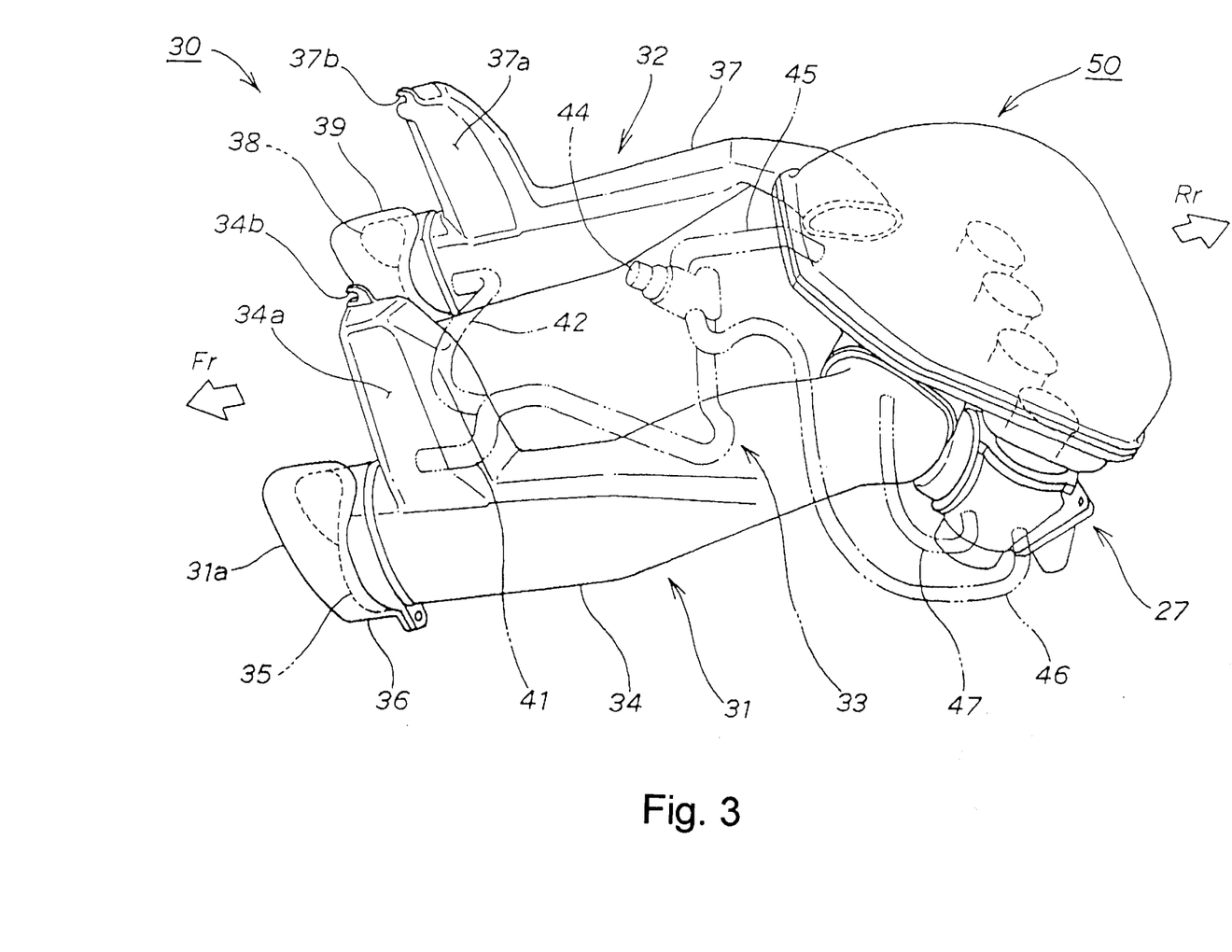
FIG. 3 is a perspective view of the air intake system of FIG. 2.

An air intake system 30 will now be described with reference to FIG. 2. FIG. 2 is a side view of components of air intake system 30, according to the present invention. The air intake system 30 includes left and right inlet ducts 31, 32 (the far inlet duct 32 is illustrated in FIG. 3) for introducing ram air. The air intake system 30 also includes an air cleaner 50 for being supplied with the air introduced from the ducts 31, 32, and a group of auxiliary tubes 33 for sending the air supplied to the air cleaner 50 for feedback.

The left and right inlet ducts 31, 32 have ends positioned at a front face of the front cowl 15 and other ends connected to the air cleaner 50. The left and right inlet ducts 31, 32 have respective retainers 34b, 37b (the far retainer 37b is illustrated in FIG. 3) secured to the cowl stay 23. The carburetor 27 includes a float chamber 27a, a diaphragm 27b, and a chamber 27c below the diaphragm 27b.

FIG. 3 is a perspective view of the components of the air intake system 30. The left inlet duct 31 comprises a duct body 34 and a cover duct 36 covering the duct body 34 with a grill 35 interposed therebetween. The left inlet duct 31 has an opening 31a. The duct body 34 has an expansion chamber 34a disposed in an intermediate portion of the duct 34 close to the cover duct 36. A retainer 34b to be secured to the cowl stay 23 (see FIG. 2) is disposed on an outer side of the expansion chamber 34a.

The right inlet duct 32 is of a shape symmetrical to the left inlet duct 31 with respect to the longitudinal direction of the motorcycle. The right inlet duct 32 includes a duct body 37, an expansion chamber 37a of the duct body 37, a retainer 37b of the duct body 37, a grill 38, and a cover duct 39.

The group of auxiliary tubes 33 (indicated by the two-dot-and-dash lines) includes a left tube 41 and a right tube 42 joined to the left tube 41. A directional control valve 44 is connected to the tubes 41, 42. A cleaner tube 45 interconnects the directional control valve 44 and the air cleaner 50. A float chamber tube 46 interconnects the directional control valve 44 and the directional float chamber 27a (see FIG. 2). A carburetor tube 47 interconnects the air cleaner 50 and the chamber 27c (see FIG. 2) below the diaphragm 27b. As described hereinafter, the group of auxiliary tubes 44 changes pressures applied to the carburetor 27 depending on the vehicle speed, thereby promoting efficient fuel atomization.

Figure 4:
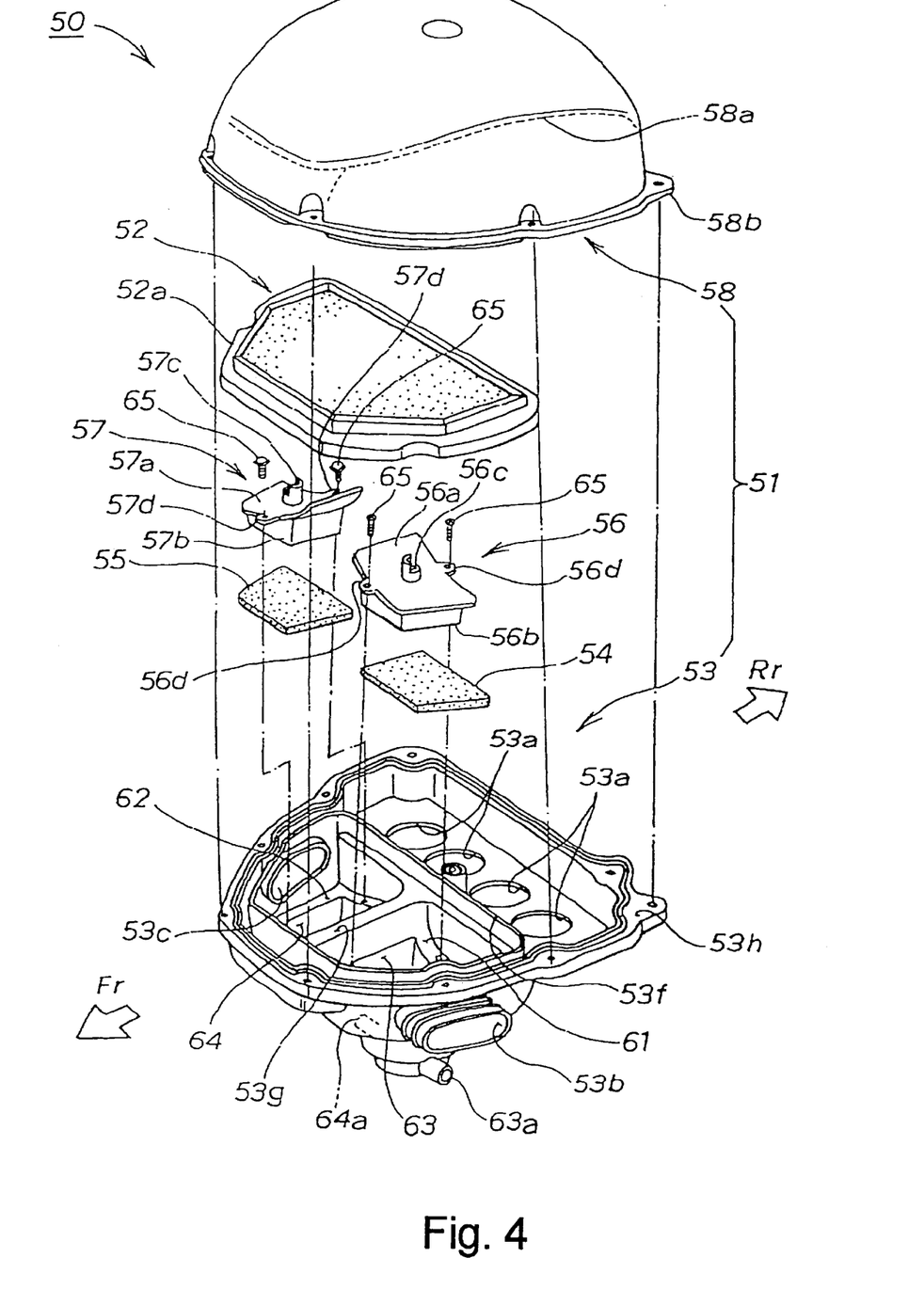
FIG. 4 is an exploded perspective view of the air cleaner of FIG. 1.

FIG. 4 is an exploded perspective view of the air cleaner 50, according to the present invention. The air cleaner 50 comprises an air cleaner case 51 and an air cleaner element 52 (hereinafter referred to as an "element 52") housed in the air cleaner case 51. The element 52 has a frame 52a.

The air cleaner case 51 comprises a case body 53 and a cover 58 covering the case body 53. The case body 53 houses left and right filters 54, 55 therein, and has left and right auxiliary guide members 56, 57 as curved guide surfaces for holding the filters 54, 55, respectively. The case body 53 has a plurality of through holes 53a to which the carburetor 27 (see FIG. 2) is attached. The case body 53 also has left and right attachments 53b, 53c formed as air inlets to which the left and right inlet ducts 31, 32 (see FIG. 3) are attached.

The case body 53 also has a partition wall 53f on which the element 52 is placed, and left and right curved guide surfaces 61, 62 for guiding air smoothly toward the element 52. A separation wall 53g divides the left and right curved guide surfaces 61, 62 from each other. Left and right branch chambers 63, 64 are formed as air branch chambers in a lower portion of the case body 53. The case body 52 also includes an edge 53h to which a cover 58 is attached.

The left branch chamber 63 has a branch port 63a, and the right branch chamber 64 has a branch port 64a. The cover 58 has a dome 58a serving as a passage for an air flow, and an edge 58b extending around the dome 58a for mating engagement with the case body 53.

The left auxiliary guide member 56 is housed in the left branch chamber 63 and has a guide surface 56a serving as a curved guide surface that lies flush with the left curved guide surface 61 when the left auxiliary guide member 56 is mounted in the case body 53. A filter presser 56b extends from the guide surface 56a, and the guide surface 56a has an air inlet 56c. The guide surface 56a has retainers 56d to be secured to the case body 53 by attachment screws 65.

The right auxiliary guide member 57 is housed in the right branch chamber 64. The right auxiliary guide member 57 is of a shape that is symmetrical to the left auxiliary guide member 56 with respect to the longitudinal direction of the motorcycle 1. The right auxiliary guide member 57 has a guide surface 57a, a filter presser 57b, an air inlet 57c, and retainers 57d. Similarly, the left filter 54 and the right filter 55 are symmetrical with respect to the longitudinal direction of the motorcycle 1.

Figure 5:
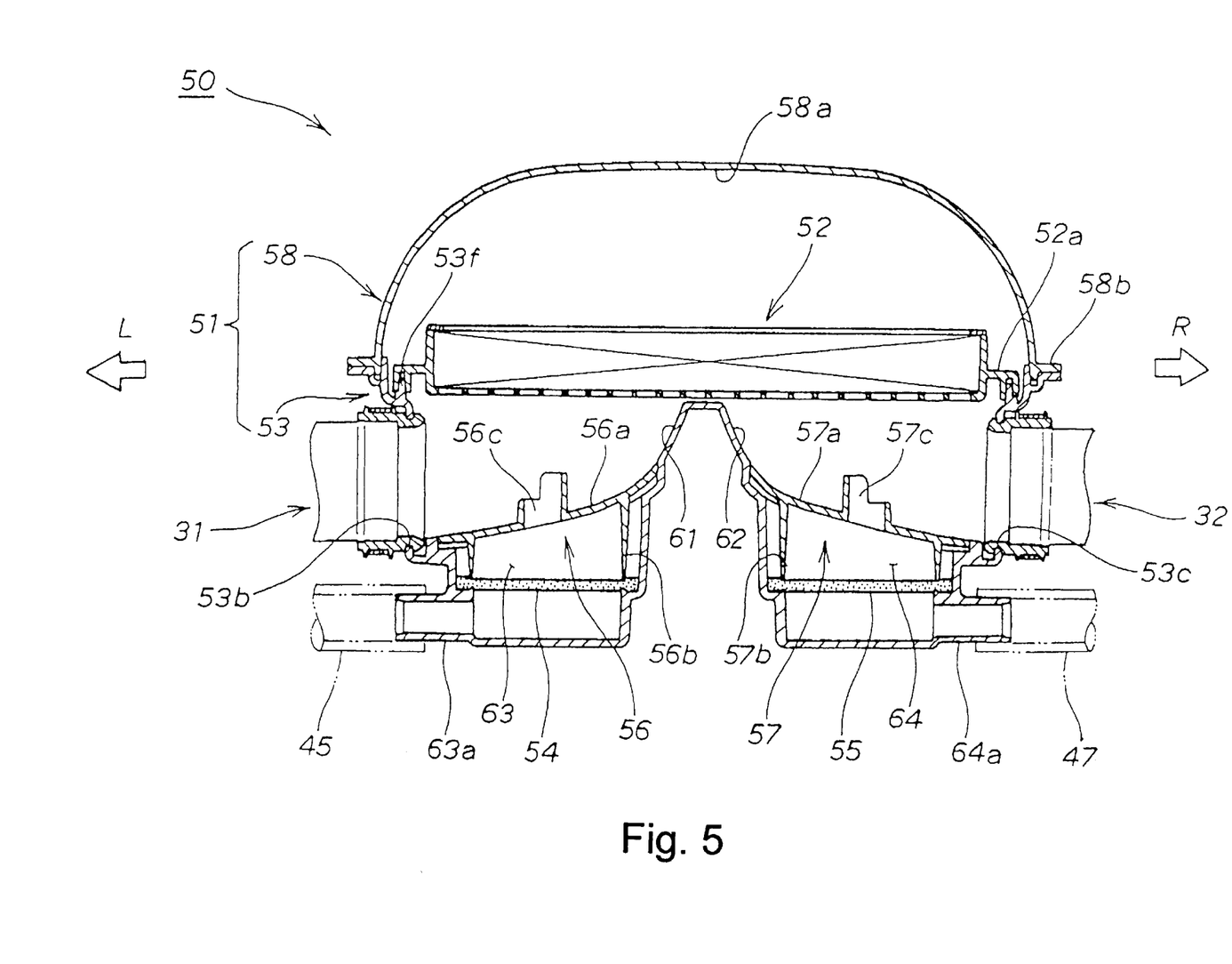
FIG. 5 is a cross-sectional view of the air cleaner.

FIG. 5 is a cross-sectional view of the air cleaner 50 illustrating the air cleaner 50 in an assembled form. The element 52 has its frame 52a placed on the partition wall 53f of the case body 53. The left inlet duct 31 is connected to the left attachment 53b of the case body 53, and the right inlet duct 32 is connected to the right attachment 53c of the case body 53.

The left curved guide surface 61 and the guide surface 56a of the left auxiliary guide member 56 lie flush with each other when they are installed in place. Likewise, the right curved guide surface 62 and the guide surface 57a of the right auxiliary guide member 57 lie flush with each other when they are installed in place.

The left filter 54 is held in place by the filter presser 56b of the left auxiliary guide member 56. The right filter 55 is held in place by the filter presser 57b of the right auxiliary guide member 57. In other words, the left and right curved guide surfaces 61, 62 have respective portions serving as the left and right auxiliary guide members 56, 57, which are detachable, and the left and right filters 54, 55 are held in place respectively by the filter pressers 56b, 57b extending from the left and right auxiliary guide members 56, 57. Therefore, since no separate parts are used for securing the left and right filters 54, 55, the number of parts used can be reduced.

The cleaner tube 45 has an end connected to the branch port 63a of the left branch chamber 63, and an opposite end connected to the directional control valve 44, as shown in FIG. 3. The carburetor tube 47 has an end connected to the branch port 64a of the right branch chamber 64, and an opposite end connected to the chamber 27c (see FIG. 2) below the diaphragm 27b.

Figure 6A:
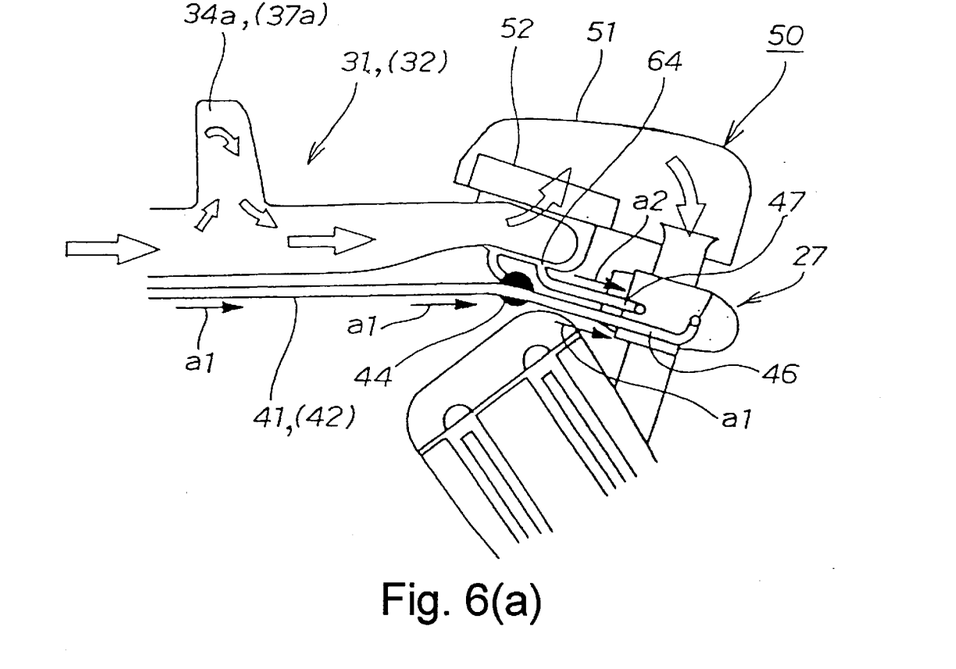
FIG. 6a is a view illustrating a first operation of the air cleaner.
Figure 6B:
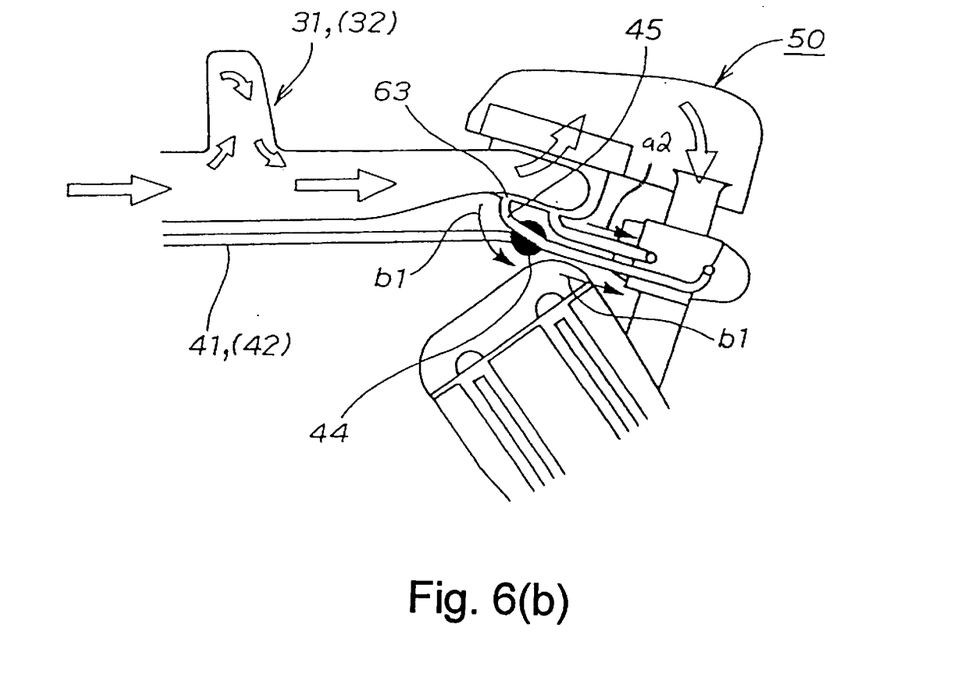
FIG. 6b is a further view illustrating the first operation of the air cleaner.

Now, with reference to FIGS. 6a and 6b, a first operation of the air cleaner 50 will be described. An air flow from the inlet duct 31 (32) to the air cleaner 50 will first be described. FIG. 6a shows an air flow at the time the speed of the motorcycle 1 is 20 kn/h or lower, and FIG. 6b shows an air flow at the time the speed of the motorcycle 1 is 20 km/h or higher. Hollow arrows indicate a main airflow, and solid arrows indicate auxiliary airflows.

In FIG. 6a, as indicated by the hollow arrows, air supplied from the inlet duct 31 (32) is introduced into the air cleaner case 51 while part of the air is passing through the expansion chamber 34a (37a). The air that has passed through the element 52 is introduced into the carburetor 27.

Air introduced from the left and right tubes 41, 42 is introduced via the directional control valve 44 and the float chamber tube 46 into the float chamber 27a (see FIG. 2), as indicated by the solid arrows al. As indicated by the solid arrow a2, the air in the air cleaner case 51 is delivered from the right branch chamber 64 via the carburetor tube 47 to the chamber 27c (see FIG. 2) below the diaphragm 27b, at all times.

In FIG. 6b, when the speed of the motorcycle 1 reaches 20 kmn/h, the directional control valve 44 is operated by a controller (not shown). The directional control valve 44 causes a switch from the left and right tubes 41, 42 to the cleaner tube 45 for introducing air in the air cleaner 50 from the left branch chamber 63 into the float chamber 27a, as shown by the solid arrows b1.

In practice, ram air is utilized to supply a ram pressure higher than the atmospheric pressure from the left and right inlet ducts 31, 32 to the air cleaner 50 when the speed of the motorcycle 1 is increased. A ram pressure which is substantially the same as the pressure in the left and right inlet ducts 31, 32 is applied to the float chamber 27a for promoting efficient fuel atomization.

Figure 7A:
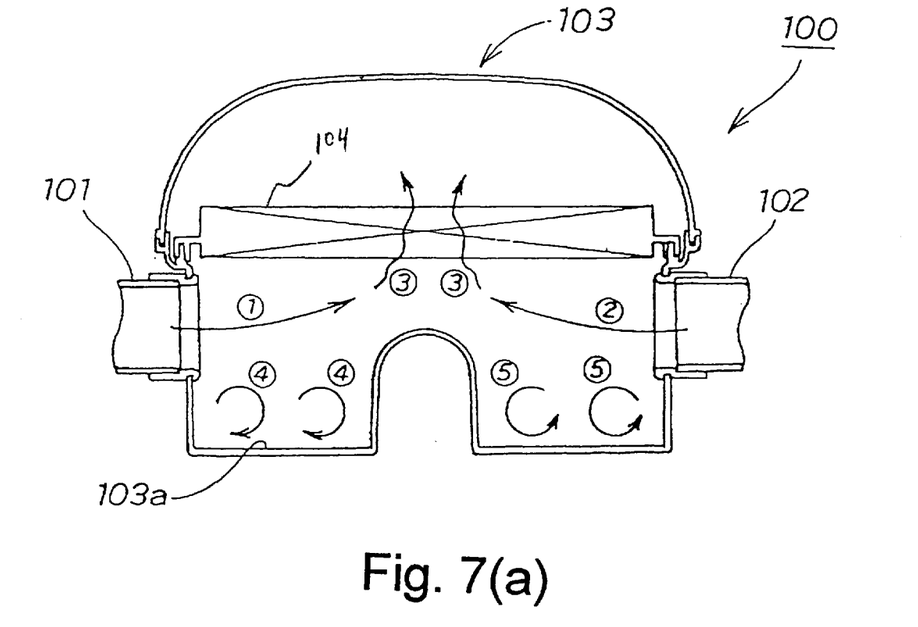
FIG. 7a is a view illustrating a second operation of an air cleaner, in accordance with the background art.
Figure 7B:
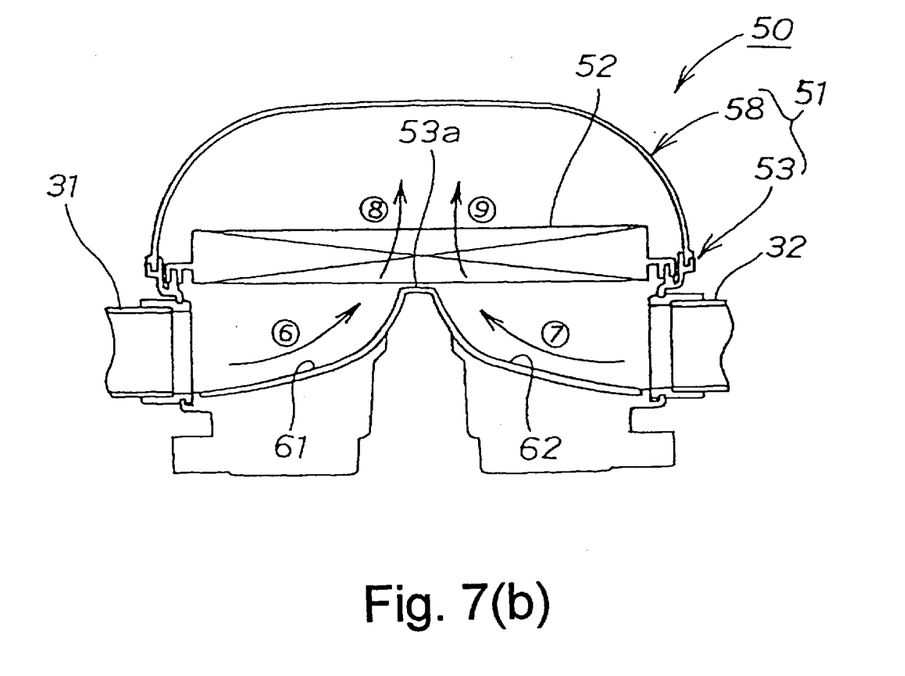
FIG. 7b is a view illustrating a second operation of the air cleaner, according to the present invention.

Air flows in the air cleaner 50 will be described below in conjunction with a comparative example. FIGS. 7a and 7b illustrate a second operation of the air cleaner. FIG. 7a shows a comparative example, and FIG. 7b shows an embodiment in accordance with the present invention.

In FIG. 7a, air flows from a left inlet duct 101 into an air cleaner 100 are indicated by the arrow (1) while air flows from a right inlet duct 102 into the air cleaner 100 are indicated by the arrow (2). The introduced air flows collide with each other in the center of an air cleaner case 103, and suffer a large pressure loss until they pass through an air filter 104, as indicated by the arrows (3). Therefore, ram air cannot effectively be introduced into a carburetor (not shown). At a bottom 103a of the air cleaner case 103, the introduced air develops vortex flows as indicated by the arrows (4) and the arrows (5), and cannot effectively be introduced into the carburetor (not shown).

In FIG. 7b, the air cleaner 50, according to the present invention, has the separation wall 53a contiguous to the left and right curved guide surfaces 61, 62. Therefore, air introduced from the left inlet duct 31 as indicated by the arrow (6), and air introduced from the right inlet duct 32 as indicated by the arrow (7) do not collide with each other, and can pass smoothly through the element 52.

The air cleaner 50 also has the left and right curved guide surfaces 61, 62 in the case body 53 of the air cleaner case 51. Air introduced from the left and right inlet ducts 31, 32 flows toward the element as indicated by the arrows (8), (9). As a result, the generation of vortexes of air in the air cleaner case 51 can be reduced.

In this embodiment, as shown in FIG. 4, the left auxiliary guide member 56 is separated from the left curved guide surface 61, and the right auxiliary guide member 57 is separated from the right curved guide surface 62. However, the left curved guide surface 61 and the left auxiliary guide member 56 may be integrally formed with each other, and likewise, the right curved guide surface 62 and the right auxiliary guide member 57 may be integrally formed with each other.

According to the present invention, the above arrangement offers many advantages. Since the air cleaner case has the curved guide surface, air introduced from the air inlet can smoothly be led to the air cleaner element. Therefore, the generation of vortexes of air introduced from the air inlet can be reduced. The curved guide surface has a portion as a detachable piece, and a filter is held by a filter presser extending from the detachable piece. Therefore, the number of parts used can be reduced. Since no separate parts are required to secure the filter, the cost of the air cleaner can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An air cleaner for use in combination with a fuel system of an engine, said air cleaner comprising:

an air cleaning element;

a casing for housing said air cleaning element;

an air inlet defined in said casing; and an air flow path from said air inlet passing through said air cleaning element, said air flow path including a direction change of approximately ninety degrees, wherein said direction change transpires over a curved guide surface formed in said casing, wherein said curved guide surface includes a panel removably attached to said casing.

2. The air cleaner according to claim 1, further comprising:

an air flow port passing through said panel; and an air branch chamber formed on one side of said panel opposite said curved guide surface.

3. The air cleaner according to claim 2, further comprising:

a filter disposed within said air branch chamber.

4. The air cleaner according to claim 3, further comprising:

an extending portion formed on said one side of said panel, said extending portion engaging said filter to hold said filter stationary.

5. The air cleaner according to claim 4, wherein said filter is sandwiched between said extending portion and said casing.

6. An air cleaner for use in combination with a fuel system of an engine, said air cleaner comprising:

an air cleaning element;

a casing for housing said air cleaning element;

an air inlet defined in said casing;

an air flow path from said air inlet passing through said air cleaning element, said air flow path including a direction chance of approximately ninety degrees, wherein said direction chance transpires over a curved guide surface formed in said casing;

an air flow port passing through said curved guide surface; and an air branch chamber formed beneath said curved guide.

7. The air cleaner according to claim 6, further comprising:

a filter disposed within said air branch chamber.

8. The air cleaner according to claim 6, further comprising:

an extending portion formed on one side of said curved guide, said extending portion engaging said filter to hold said filter stationary, wherein said filter is sandwiched between said extending portion and said casing.

9. An air cleaner for use in combination with a fuel system of an engine, said air cleaner comprising:

an air cleaning element;

a casing for housing said air cleaning element;

a first air inlet defined in one side of said casing;

a second air inlet defined in a second side of said casing;

a first air flow path from said first air inlet passing through said air cleaning element, said first air flow path including a first direction change of approximately ninety degrees, wherein said first direction change transpires over a first curved guide surface formed in said casing; and a second air flow path from said second air inlet passing through said air cleaning element, said second air flow path including a second direction change of approximately ninety degrees, wherein said second direction change transpires over a second curved guide surface formed in said casing.

10. The air cleaner according to claim 9, further comprising:

a partitioning wall formed between said first curved guide surface and said second curved guide surface.

11. The air cleaner according to claim 10, wherein said partitioning wall extends up to said air cleaning element to thereby separate said first air flow from said second air flow prior to said first and second air flows passing through said air cleaning element.

12. The air cleaner according to claim 11, wherein said first curved guide surface includes a first panel removably attached to said casing, and said second curved guide surface includes a second panel removably attached to said casing.

13. The air cleaner according to claim 12, further comprising:

a first air flow port passing through said first panel;

a first air branch chamber formed on one side of said first panel opposite said first curved guide surface;

a second air flow port passing through said second panel; and a second air branch chamber formed on one side of said second panel opposite said second curved guide surface.

14. The air cleaner according to claim 13, further comprising:

a first filter disposed within said first air branch chamber; and a second filter disposed within said second air branch chamber.

15. The air cleaner according to claim 14, further comprising:

a first extending portion formed on said one side of said first panel, said first extending portion engaging said first filter to hold said first filter stationary; and a second extending portion formed on said one side of said second panel, said second extending portion engaging said second filter to hold said second filter stationary.

16. The air cleaner according to claim 15, wherein said first filter is sandwiched between said first extending portion and said casing and said second filter is sandwiched between said second extending portion and said casing.

17. The air cleaner according to claim 9, further comprising:

a first air flow port passing through said first curved guide surface;

a first air branch chamber formed beneath said first curved guide surface;

a second air flow port passing through said second curved guide surface; and a second air branch chamber formed beneath said second curved guide surface.

18. The air cleaner according to claim 17, further comprising:

a first filter disposed within said first air branch chamber; and a second filter disposed within said second air branch chamber.

19. The air cleaner according to claim 10, further comprising:

a first air flow port passing through said first curved guide surface;

a first air branch chamber formed beneath said first curved guide surface;

a second air flow port passing through said second curved guide surface; and a second air branch chamber formed beneath said second curved guide surface.

20. The air cleaner according to claim 19, further comprising:

a first filter disposed within said first air branch chamber; and a second filter disposed within said second air branch chamber.

* * * * *